United States Patent [19]
Houst et al.

[11] 3,719,871
[45] March 6, 1973

[54] CAM ACTUATED SWITCHING ASSEMBLY

[75] Inventors: Douglas R. Houst, Pattersonville; Kamal Iskandar, Scotia, both of N.Y.

[73] Assignee: General Electric Company, Erie, Pa.

[22] Filed: Dec. 22, 1971

[21] Appl. No.: 211,011

[52] U.S. Cl. ............... 318/139, 318/422, 200/153 T, 307/10
[51] Int. Cl. ............................................. B60l 13/00
[58] Field of Search .............. 200/61.89, 86.5, 153 T; 307/10; 318/17, 139, 305, 422

[56] References Cited

UNITED STATES PATENTS

| | | | |
|---|---|---|---|
| 3,559,020 | 1/1971 | Imaizumi et al. | 318/422 X |
| 2,598,669 | 6/1952 | Battilana | 318/422 X |
| 2,492,395 | 12/1949 | Pavitt et al. | 318/422 X |

*Primary Examiner*—Bernard A. Gilheany
*Assistant Examiner*—W. E. Duncanson, Jr.
*Attorney*—Walter C. Bernkoff et al.

[57] ABSTRACT

A throttle switch assembly for electric traction vehicles wherein the pivoting of a foot pedal causes linear movement of a spring biased rod and attached cam having a contact surface canted with respect to plural rows of switches so as to sequentially engage and actuate the switches in one row and subsequently sequentially accuate the switches in successive rows to change the power output from the vehicle motor.

27 Claims, 5 Drawing Figures

PATENTED MAR 6 1973

CAM ACTUATED SWITCHING ASSEMBLY

BACKGROUND OF THE INVENTION

This invention relates generally to cam-actuated switching arrangements, and more particularly, to a foot-actuated throttle assembly for electric traction vehicles.

Speed and acceleration of electric traction vehicles can be controlled either mechanically or electrically. However, for the most efficient operation, the latter is preferred.

It is well-known to control the output of a single motor or a plurality of motors by a series of switches, selectively actuated in sequence so as to progressively vary the power output from the motor(s). In the use of plural motors, the total output can be varied by completely disconnecting any number of the motors from the current supply circuit. Where a single motor is used, its power output can be varied by selectively inserting or removing successive increments of resistance in either the motor armature circuit or the field winding circuit, or in combinations thereof. In either case, the greater number of switches that are available to sequentially actuate, the greater range and precision that can be achieved in the power control of the vehicle.

Of equal importance in the throttle control of an electric vehicle is that of the ease and flexibility with which the operator can effect a speed change to the vehicle. A throttle lever or foot-pedal which can be selectively positioned into a number of positions may be used by the operator to actuate a plurality of switches with a single control element.

It is, therefore, an object of this invention to provide an improved throttle switching assembly for an electric traction vehicle.

Another object of this invention is the provision for achieving a wide range of throttle control in an electric vehicle while maintaining a high degree of precision.

A further object of this invention is the provision for a throttle control system which is compact and simple to operate.

Yet another object of this invention is the provision for an electric motor throttle assembly which is extremely functional and economical to manufacture and durable in use.

These objects and other features and advantages will become more readily apparent upon reference to the following description when taken in conjunction with the appended drawings.

SUMMARY OF THE INVENTION

This invention relates to a switching arrangement wherein movement of a cam in a direction orthogonal to rows and columns of switches, sequentially actuates the switches. A flat polygonal cam which is moved linearly in the direction of the columns has a leading edge canted with respect to the rows of switches so as to establish initial contact with only one switch at a time. The cam sequentially actuates the switches in the first row, and subsequently, sequentially actuates the switches in successive rows.

The arrangement is suitable for progressively changing the output of a traction vehicle electric drive motor by successive actuation of the plurality of switches. Depression of a spring biased foot pedal causes linear movement of the cam member, which successively engages the switch contacts and actuates them in succession to change the resistance in the motor armature circuit and field circuit.

Figure 1:
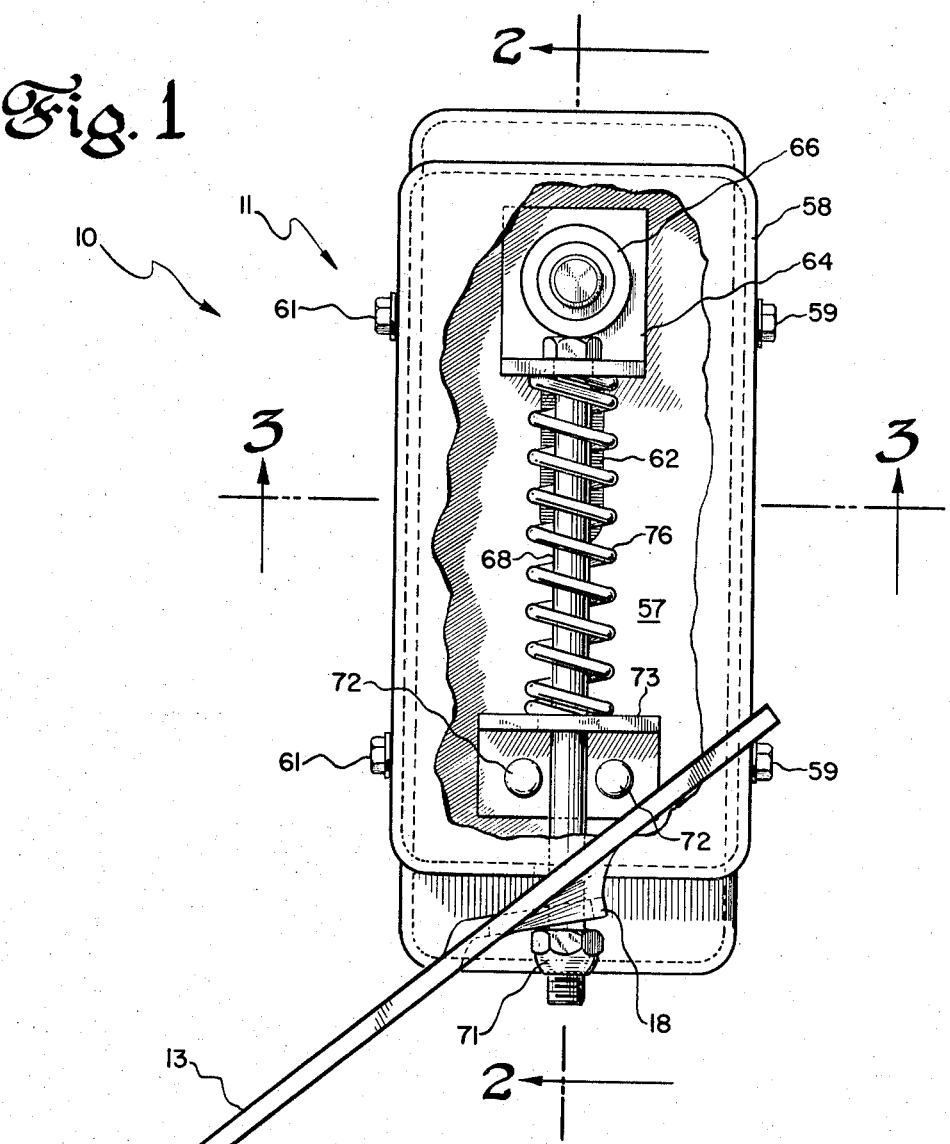
FIG. 1 is a front elevational view of the preferred embodiment view of the preferred embodiment, with a portion broken away for clarity.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 2:
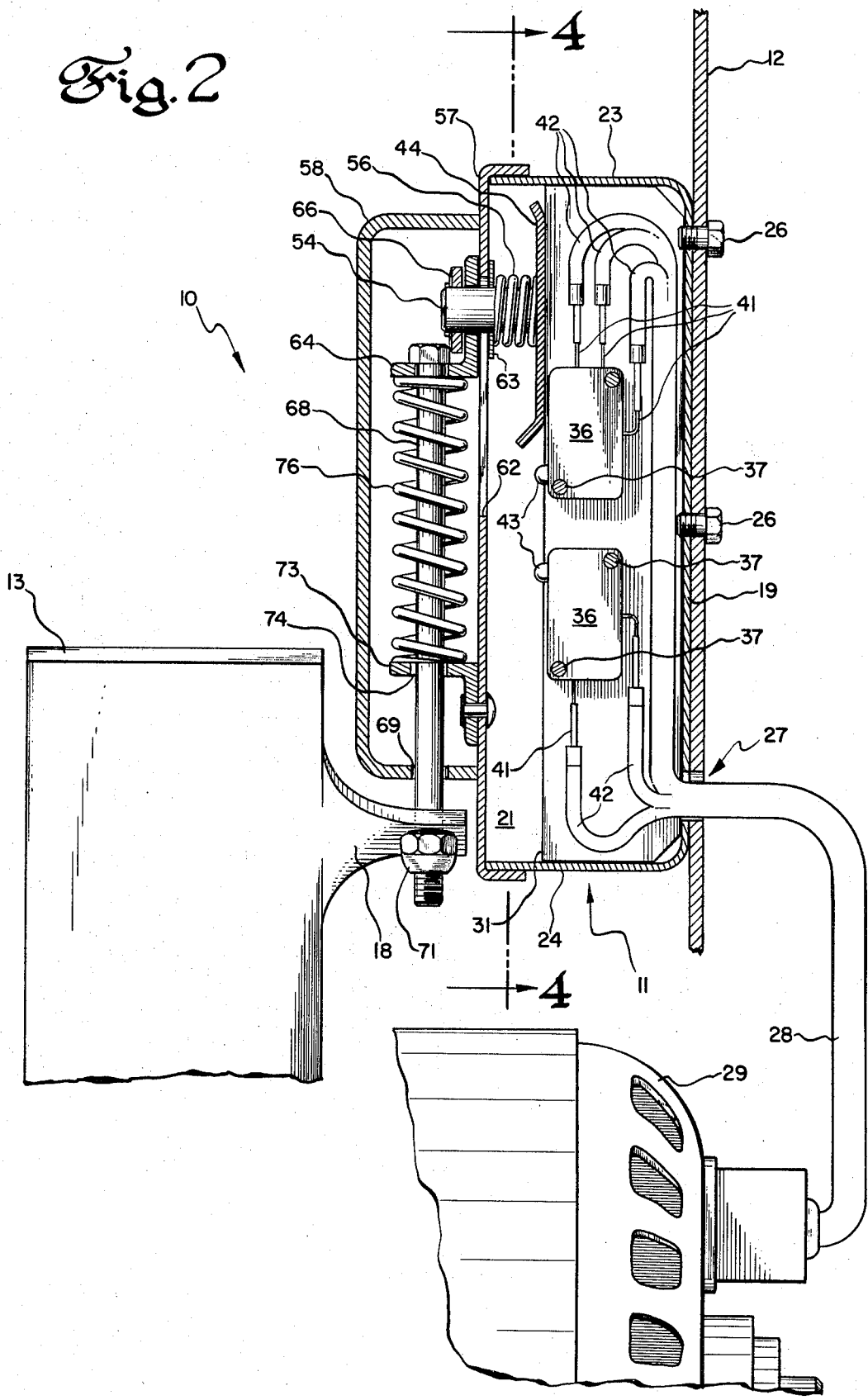
FIG. 2 is a side sectional view thereof as taken along lines 2—2 of FIG. 1.

Reference is now made to FIGS. 1 and 2, wherein the throttle assembly is indicated generally at 10.

The invention disclosed herein describes a switching arrangement which may be utilized in various control arrangements requiring sequential switching. For illustrative purposes, however, the description will refer to its use in a throttle control mechanism or an electric traction vehicle.

A typical mounting arrangement provides for installation of the housing 11 on a sidewall 12 of the vehicle with a foot pedal 13 extending rearwardly from the housing to pivotally connect to the floorboard 14 of the vehicle. In the embodiment shown, an S-shaped portion 16 is formed at the rear end of the foot pedal 13 so as to pivotally rest in an opening 17 formed in the vehicle floorboard 14. A pivotable connection could just as well be made at a point intermediate the two ends of the foot pedal 13. An arm 18 is secured to an extends obliquely from the foot pedal at a point near its front end so as to impart a substantially linear downward movement to a contacting portion of the housing assembly when the foot pedal 13 is depressed.

The housing 11 is boxlike and has a rear wall 19, side-walls 21 and 22, an upper wall 23 and a lower wall 24. The rear wall 19 is secured to the vehicle sidewall 12 by a pair of bolts 26 and a hole 27 is formed thereon for the passing of a control cable 28 from within the housing 11 to the electric motor 29 mounted in the vehicle.

Disposed within the housing 11 along the sidewalls thereof, are a pair of spaced longitudinal retaining bars 31 and 32 (FIGS. 2, 3 and 4), extending the length of the housing. On the outer sides of the bars are recesses which provide spaces 33, between the bars and the inner sides of the sidewalls 21 for receiving securing nuts 34. The frontal edges of the bars 31 and 32 have longitudinal faces 35 and 40, respectively, which form a seat on which the cam slides, as will be described hereinafter.

A plurality of micro switches 36 (FIGS. 2, 3, and 4) are secured between the longitudinal retaining bars 31 and 32 by four retaining bolts 37 extending therethrough and secured on the ends by the nuts 34. The switches are disposed in first and second rows 38 and 39, extending transversely across the housing in a single plane with the two rows being aligned so as to form four longitudinal columns. It should be noted that various arrangements of the switches can be made while remaining within the scope of the invention. However, the plurality of switches should be arranged in at least one row, and preferably in a plurality of longitudinally spaced rows, as shown in FIG. 4.

The switches 36 are coupled at their terminals 41 to individual leads 42 from the control cable 28. The particular types of switches employed, their relative placement within the housing, and the circuits into which each is coupled can be varied to suit the desired sequential control. A typical arrangement for use in controlling the single electric motor 29 is that of having the first row 38 comprising normally-open switches, which when sequentially activated, cut out successive segments of resistance in a series circuit with the motor armature, thereby progressively increasing the current supply to the motor. The second row of switches 39 are of the normally closed type, which when sequentially activated, introduce successive increments of resistance in the series circuit of the motor field winding and thereby introduce field weakening.

The micro-switches are of the snap-action type, each having a spring biased plunger 43 which is actuated by an inward depression toward the housing rear wall. The actuation of the switches is affected by the linear movement of a cam member 44 as it is moved linearly downwardly from near the upper wall 23 towards the lower wall 24.

Figure 3:
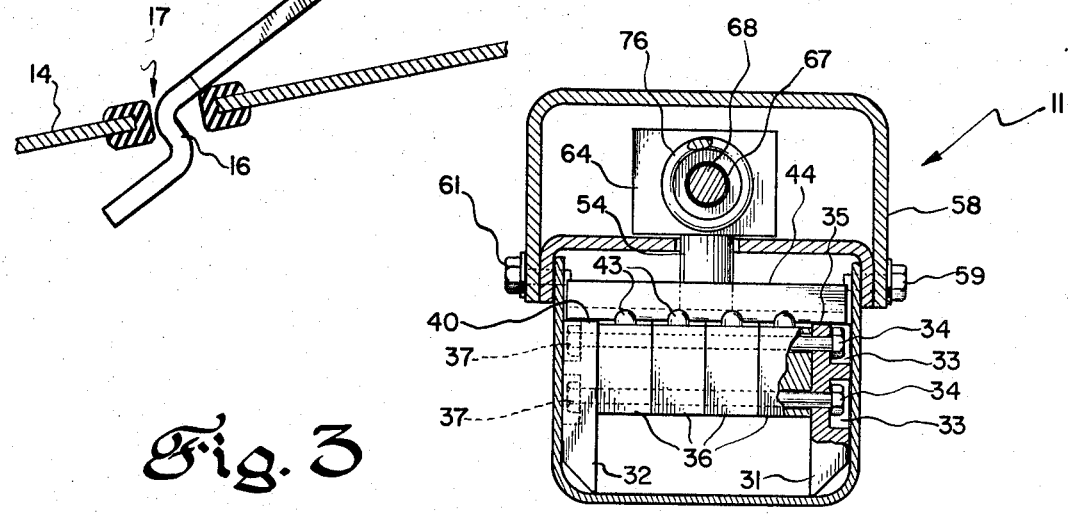
FIG. 3 is a sectional view thereof as taken along lines 3—3 of FIG. 1.
Figure 4:
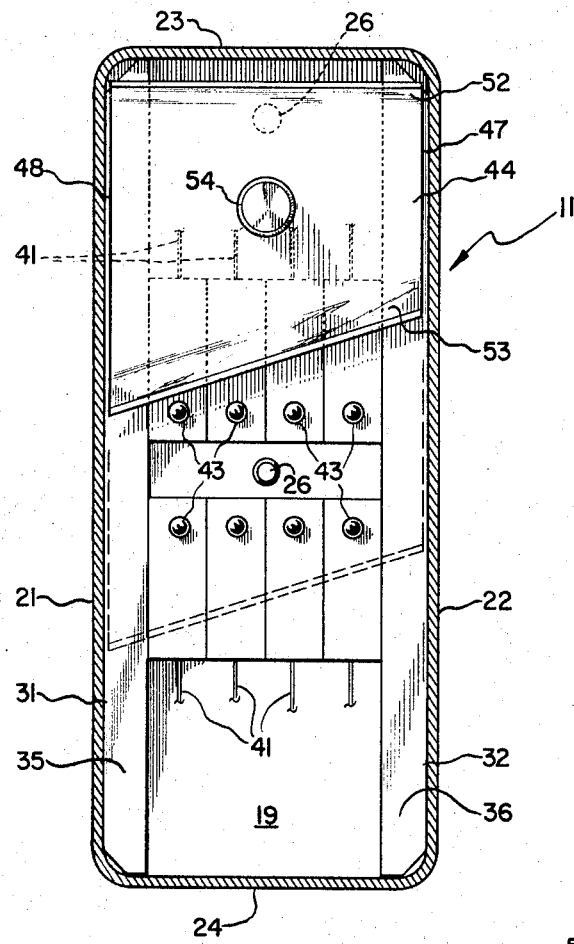
FIG. 4 is a sectional view thereof as taken along lines 4—4 of FIG. 2, showing the relationship between cam and switch contactors.
Figure 5:
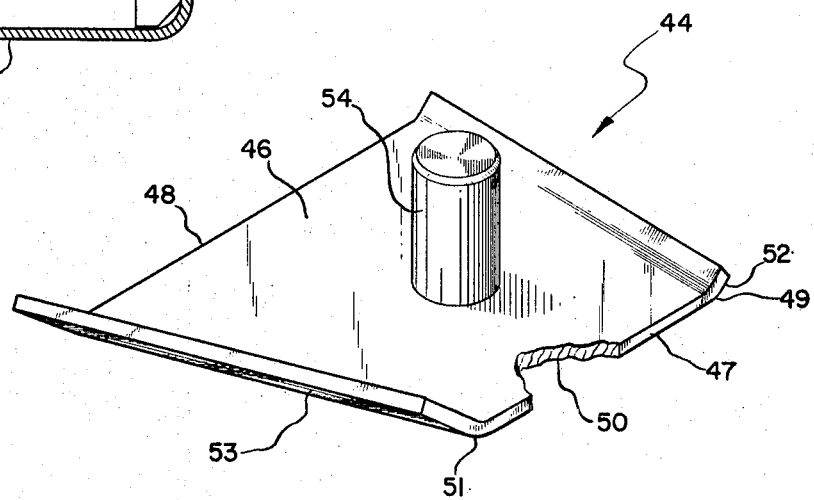
FIG. 5 is a perspective view of the cam portions of the preferred embodiment.

The cam member 44 is shown in its relative operational position at FIGS. 2, 3, and 4, and in perspective at FIG. 5. It comprises a flat polygonal plate 46 (FIG. 5) having parallel side edges 47 and 48, a top edge 49 extending normally therebetween, and a lower edge 51 canted with respect to the top edge, so as to form an oblique angle with the rows of switches 38 and 39 when in its operational position (FIG. 4). One side of the plate 46 forms a contact surface 50 for establishing and maintaining frictional engagement with the plungers 43 during operation of the throttle assembly, as will be hereinafter more fully described.

Attached to and forming an integral part of the plate 46 are the beveled sections 52 and 53, the former at the top edge 49 thereof, and the latter at the lower edge 51 thereof. The sections 52 and 53 form an angle with respect to the plane of the plate so as to extend outwardly away from the plane of the switch plungers 43, and thereby provide for a smooth engagement with, and actuation of the plungers 43.

Extending normally outward from the plate 46 on the side opposite that of the contact surface 50 is a shaft 54 (FIG. 2) on which is disposed a helical compressor spring 56 biasing the cam member inwardly to rest against the longitudinal faces 35 and 40 of the retaining bars. The cam member is disposed so as to be slidable along the length of the longitudinal faces 35 and 40, with the beveled portions 52 and 53 providing for smooth relative movement therebetween.

Actuation of the switches in succession is effected by movement of the cam member from the upward position shown in FIGS. 2 and 4 to a lower position indicated by the dashed lines in FIG. 4. Such movement will cause the cam contact surface 50 to engage and actuate in succession the plungers 43 in the first row 38 and subsequently those in the second row 39 such as to provide for incrementally increasing the available speed of the electric motor, switches may of course also be utilized to perform other functions. For example, in a typical switching arrangement a first switch in the first row 38 is to be connected in the propulsion circuit to assure that the motor is not energized under improper conditions.

Removably attached to the housing 11 is an inner cover 57 (FIGS. 1, 2, and 3) and an outer cover 58, both attached at the housing sidewalls 21 and 22 by screws 59 and 61, respectively. The inner cover 57 is disposed in a close-fit relationship over the walls of the housing and the outer cover 58 rests against the frontal surface of the inner cover. Centrally formed in the inner cover 57 is an elongate slot 62 (FIG. 1) through which the shaft 54 extends. The shaft may be selectively positioned along the length of the slot to place the cam member in the desired position. A washer 63 is located on the shaft 54 between the spring 56 and the inner cover 57 to bias the spring and slidably contact the inner wall of the inner cover 57. It should be noted that the spring biased cam member 44 provides the pressure to maintain the longitudinal retaining bars, 31 and 32, and the attached switches, inside the housing. The fact that no securing means is required is an advantageous arrangement that allows for a simple modification of the assembly to add or modify switching functions.

On the opposite side of the inner cover 57, an L-shaped bracket 64 is secured at its one side to the shaft 54 by a nut 66. The other side of the L-shaped member extends outwardly and has a hole 67 formed normally therethrough. Disposed in the hole 67 is a rod 68 or bolt for imparting longitudinal movement to the bracket 64. The rod 69 extends downwardly through a hole 69 in the outer cover 58, with the pedal arm 18 being fastened thereto by a nut 71.

Secured to the inner cover 57 by rivets 72, or the like, is an angle 73 having one side contiguous with the inner cover surface and the other side extending outwardly and having an aperture 74 formed therein for slidably receiving the rod 68 therethrough. A compression spring 76 is located over the rod 68 to provide compression between the angle 73 and the L-shaped bracket, thereby biasing the latter in an upward position. The spring 76 then not only biases the cam member upwardly but also biases the foot pedal 13 in an upward position. Depression of the foot pedal 13 causes proportionate linear movement of the rod 68 along its longitudinal axis, together with the cam member 44, which cooperates with the rows of plungers so as to sequentially actuate the switches in the first row 38 and subsequently actuate the switches in the second row 39.

What I claim as new and desire to secure by Letters Patent of the United States are:

1. A switching assembly for sequentially actuating a plurality of switches the assembly comprising:

a. a housing having first and second longitudinally displaced ends;

b. a plurality of switches secured in said housing and having actuating contacts arranged in substantially longitudinal columns and transverse rows, said contacts adjusted to be moved in a direction orthogonal with respect to said rows and columns from a first biased position to a second actuated position;

c. a polygonal cam member mounted in said housing and having a contact surface spanning the transverse limits of said rows of switches, said contact surface having a leading edge nearest said housing second end which is canted with respect to at least one of said rows of switches so as to maintain a varied longitudinal relationship therewith; and d. means for selectively moving said cam member longitudinally between said housing first and second ends so as to sequentially contact and move to said second actuated position, said actuator contacts in the first row, and subsequently in each successive row, so as to actuate the associated switches in sequence.

2. A switching assembly as set forth in claim 1 wherein said plurality of actuators are disposed in a single plane.

3. A switching assembly as set forth in claim 1 wherein said cam member leading edge is beveled outwardly away from said contacts so as to provide a gradual engagement relationship with said contacts as it is longitudinally moved from said housing first end said housing second end.

4. A switching assembly as set forth in claim 1 wherein said cam member includes a flat portion disposed in the plane of longitudinal movement and further wherein said flat portion is biased normally thereto towards said plurality of switches.

5. A switching assembly as defined in claim 1 wherein said cam member is biased toward said housing first end.

6. A switching assembly as set forth in claim 5 wherein said means for selectively moving said cam member includes a lever mechanically connected to said cam member at one point thereon, and pivotably connected to a fulcrum at another point thereon, whereby pivoting of said lever about said fulcrum causes said cam member to move in its longitudinal path between said housing first and second ends.

7. A switching assembly as set forth in claim 6 wherein said mechanical connection comprises a rod aligned in parallel relationship to said longitudinal path, said rod having its one end rigidly secured to said cam member and its other end mechanically connected to said lever, whereby, when the lever is pivoted, said rod is moved axially in the direction of longitudinal movement so as to cause said cam member to be similarly moved.

8. A switching assembly as set forth in claim 7 wherein said cam member is biased toward said housing first end, and said lever, at the point where it is connected to said rod, is biased in the same direction by a spring acting along the longitudinal axis of said rod.

9. A switching assembly as set forth in claim 1 wherein said plurality of switches are secured in said housing by a pair of interconnecting longitudinal bars straddling said rows, said bars having longitudinal faces opposing said cam contact surface so as to provide sliding engagement therewith.

10. A switching assembly as set forth in claim 9 wherein said cam member has a following edge nearest said housing first end, said following edge being beveled outwardly away from said bar longitudinal faces so as to provide a smooth sliding engagement with said bar longitudinal faces during movement of said cam member towards said housing first end.

11. A throttle switching assembly for sequentially actuating a plurality of switches to change the speed of a traction vehicle powered by an electric motor, the assembly comprising:

a. a housing mounted on the vehicle and having first and second longitudinally displaced ends;

b. a plurality of switches disposed in said housing and having actuating contacts arranged in substantially longitudinal columns and transverse rows, said contacts adapted to be moved in a direction orthogonal with respect to said rows and columns from a first biased position to a second actuated position;

c. a polygonal cam member mounted in said housing and having a contact surface spanning the transverse limits of said rows of switches, said contact surface having a leading edge nearest said housing second end which is canted with respect to at least one of said rows of switches, so as to maintain a varied longitudinal relationship therewith;

d. means for selectively moving said cam member longitudinally between said housing first and second ends so as to sequentially contact and move to said second actuated position, said actuator contacts in the first row, and subsequently in each successive row, so as to actuate the associated switches in sequence; and e. control means for changing the output of the electric motor in response to the actuation of said switches.

12. A throttle switching assembly as set forth in claim 11 wherein said control means comprises a plurality of resistance elements in series with the armature circuit of the motor and further wherein actuation of said plurality of switches removes said resistance elements from said circuit in sequence so as to increase the current to the motor armature.

13. A throttle switching assembly as set forth in claim 12 wherein a first switch actuated by said cam member completes a circuit which provides the initial current for starting said electrical motor, and successive switches actuated in sequence by continued movement of said cam member function to progressively reduce the total resistance in the armature circuit.

14. A throttle switching assembly as set forth in claim 11 wherein said control means comprises the field circuit of the motor and further wherein actuation of said plurality of switches in sequence tends to add incremental steps of resistance in said field circuit so as to introduce field weakening and thereby progressively increase the power output of the electric motor.

15. A switching assembly as set forth in claim 11 wherein said plurality of actuators are disposed in a single plane.

16. A switching assembly as set forth in claim 11 wherein said cam member leading edge is beveled outwardly from said contacts so as to provide a gradual engagement relationship with said contacts as it is longitudinally moved from said housing first end to said housing second end.

17. A switching assembly as set forth in claim 11 wherein said cam member includes a flat portion disposed in the plane of longitudinal movement and further wherein said flat portion is biased normally thereto towards said plurality of switches.

18. A switching assembly as set forth in claim 11 wherein said cam member is biased toward said housing first end.

19. A switching assembly as set forth in claim 18 wherein said means for selectively moving said cam member includes a lever mechanically connected to said cam member at one point thereon, and pivotably connected to a fulcrum at another point thereon, whereby pivoting of said lever about said fulcrum causes said cam member to move in its longitudinal path between said housing first and second ends.

20. A switching assembly as set forth in claim 19 wherein said mechanical connection comprises a rod aligned in parallel relationship to said longitudinal path, said rod having its one end rigidly secured to said cam member and its other end mechanically connected to said lever, whereby when the lever is pivoted, said rod is moved axially in the direction of longitudinal movement so as to cause said cam member to be similarly moved.

21. A switching assembly as set forth in claim 20 wherein said cam member is biased towards said housing first end, and said lever, at the point where it is connected to said rod, is biased in the same direction by a spring acting along the longitudinal axis of said rod.

22. A switching assembly as set forth in claim 11 wherein said plurality of switches are secured in said housing by a pair of interconnecting longitudinal bars straddling said rows, said bars having longitudinal faces opposing said cam contact surface so as to provide frictional engagement therewith.

23. A switching assembly as set forth in claim 18 wherein said cam member has a following edge nearest said housing first end, said following edge being beveled outwardly away from said bar longitudinal faces so as to provide a smooth sliding engagement with said bar longitudinal faces during movement of said cam member towards said housing first end.

24. A throttle switching assembly for sequentially actuating a plurality of switches to change the speed of a traction vehicle powered by an electric motor, the assembly comprising:
   a. a housing mounted on the vehicle and having first and second longitudinally displaced ends;
   b. a plurality of switches disposed in said housing and having actuating contacts arranged in substantially longitudinal columns and transverse rows, said contacts adapted to be moved in a direction orthogonal with respect to said rows and columns from a first biased position to a second actuated position;
   c. a polygonal cam member disposed in said housing and having a longitudinal contact surface contiguous with the plane of said actuating contacts, and a shaft extending normally from the side opposite said contacts;
   d. contactor biasing means for biasing said cam member against said contacts, in a direction along the axis of said shaft;
   e. a rod secured at its core end to said shaft and extending longitudinally in parallel relationship to said cam contact surface;
   f. means for selectively moving said rod along its longitudinal axis so as to move the cam member longitudinally between said housing first and second ends so as to sequentially engage said actuator contacts and move them to said second actuated position so as to actuate the associated switches in sequence and control means for changing the output of the electric motor in response to the actuation of said switches.

25. A switching assembly as set forth in claim 24 and including rod biasing means for biasing said rod in the position wherein said cam member is nearest to said housing first end and wherein said cam member is nearest to said housing first end and wherein the cam member makes no contact with any of said actuator contacts.

26. A switching assembly as set forth in claim 25 wherein said means for selectively moving said rod along its longitudinal axis comprises a lever mechanically connected to said rod at one point and pivotably secured to a fulcrum at another point.

27. A switching assembly as set forth in claim 24 wherein said plurality of switches are secured in said housing by a pair of interconnecting longitudinal bars straddling said rows, said bars having longitudinal faces opposing said cam contact surface so as to provide sliding engagement therewith.

* * * * *